US011235490B2

(12) United States Patent
Guenster et al.

(10) Patent No.: US 11,235,490 B2
(45) Date of Patent: Feb. 1, 2022

(54) METHOD FOR THE ADDITIVE LASER-INDUCED PRODUCTION OF A MAIN PART BY MEANS OF SLIP CASTING

(71) Applicant: ALUMINA SYSTEMS GMBH, Redwitz (DE)

(72) Inventors: Jens Guenster, Berlin (DE); Juergen Heinrich, Selb (DE); Thomas Muehler, Clausthal-Zellerfeld (DE)

(73) Assignee: Alumina Systems GmbH, Redwitz (DE)

(*) Notice: Subject to any disclaimer, the term of this patent is extended or adjusted under 35 U.S.C. 154(b) by 737 days.

(21) Appl. No.: 15/854,110

(22) Filed: Dec. 26, 2017

(65) Prior Publication Data

US 2018/0141235 A1    May 24, 2018

Related U.S. Application Data

(63) Continuation of application No. PCT/EP2016/064461, filed on Jun. 22, 2016.

(30) Foreign Application Priority Data

Jun. 26, 2015  (DE) ...................... 10 2015 110 360.5

(51) Int. Cl.
| | |
|---|---|
| *B33Y 10/00* | (2015.01) |
| *B33Y 70/00* | (2020.01) |
| *B33Y 50/02* | (2015.01) |
| *C04B 35/622* | (2006.01) |
| *B28B 11/24* | (2006.01) |
| *B28B 1/00* | (2006.01) |
| *C04B 35/626* | (2006.01) |
| *B28B 17/00* | (2006.01) |

(52) U.S. Cl.
CPC ............ *B28B 1/001* (2013.01); *B28B 11/243* (2013.01); *B33Y 10/00* (2014.12); *B33Y 70/00* (2014.12); *C04B 35/622* (2013.01); *C04B 35/62645* (2013.01); *B28B 17/0081* (2013.01); *B33Y 50/02* (2014.12); *C04B 2235/606* (2013.01); *C04B 2235/608* (2013.01); *C04B 2235/6026* (2013.01); *C04B 2235/6027* (2013.01)

(58) Field of Classification Search
None
See application file for complete search history.

(56) References Cited

U.S. PATENT DOCUMENTS

| | | | | |
|---|---|---|---|---|
| 5,354,414 A | * | 10/1994 | Feygin ...................... | B22C 9/00 216/34 |
| 6,027,326 A | * | 2/2000 | Cesarano, III .......... | B28B 1/001 425/375 |
| 6,531,191 B1 | | 3/2003 | Notenboom | |
| 6,827,988 B2 | * | 12/2004 | Krause ................... | B33Y 10/00 427/596 |
| 2004/0075197 A1 | * | 4/2004 | Tang ...................... | B28B 1/001 264/430 |
| 2006/0119017 A1 | * | 6/2006 | Tang ...................... | B28B 1/001 264/642 |
| 2015/0367415 A1 | * | 12/2015 | Buller ..................... | B22F 3/004 419/53 |
| 2020/0399181 A1 | * | 12/2020 | Gasgnier ............... | B33Y 70/00 |

FOREIGN PATENT DOCUMENTS

| | | | |
|---|---|---|---|
| DE | 10217670 A1 | 11/2003 | |
| WO | WO-2015023612 A2 * | 2/2015 | ............... C09K 8/80 |

OTHER PUBLICATIONS https://web.archive.org/web/20120211211129/https://en.wikipedia.org/wiki/Carbon_dioxide_laser, 2012 (Year: 2012).*
https://web.archive.org/web/20120226134508/https://en.wikipedia.org/wiki/Osmosis, 2012 (Year: 2012).*
https://web.archive.org/web/20120302121121/https://en.wikipedia.org/wiki/Capillary_action, 2012 (Year: 2012).*
"Sintering." Sintering, Wikipedia, the Free Encyclopedia, May 24, 2015, web.archive.org/web/20150524044733/en.wikipedia.org/wiki/Sintering. (Year: 2015).*
Mühler, Thomas, et al. "Slurry-Based Additive Manufacturing of Ceramics." International Journal of Applied Ceramic Technology, vol. 12, No. 1, 2013, pp. 18-25., doi:10.1111/ijac.12113. (Year: 2013).*
James Funk, (Predictive Process Control of Crowded Particulate Suspensions Applied to Ceramics Manufacturing, 1994) (Year: 1994).*
"Thermal Energy."Wikipedia, Wikimedia Foundation, Apr. 15, 2016, https://web.archive.org/web/20160415051549/https://en.wikipedia.org/wiki/Thermal_energy (Year: 2016).*
"Stereolithography." Wikipedia, Wikimedia Foundation, May 20, 2015, web.archive.org/web/20150520222249/en.wikipedia.org/wiki/Stereolithography. (Year: 2015).*

(Continued)

*Primary Examiner* — Alison L Hindenlang
*Assistant Examiner* — Andrés E. Behrens, Jr.
(74) *Attorney, Agent, or Firm* — Laurence A. Greenberg; Werner H. Stemer; Ralph E. Locher

(57) ABSTRACT

A method for the additive production of a ceramic main part has the following steps: providing a slip of ceramic base material particles suspended in a liquid phase; producing a slip layer; orienting the radiation of a laser light source onto a section of the slip layer; evaporating liquid phase out of the slip layer in the section of the slip layer onto which the radiation of the laser light source is oriented or was oriented; forming a section of the ceramic main part in the slip layer in a sinter-free manner; optionally repeating the steps of producing a slip layer, orienting the radiation, evaporating the liquid phase, and forming a section of the main part in a sinter-free manner until the ceramic main part is provided; and separating the ceramic main part from the slip.

20 Claims, No Drawings

(56) References Cited

OTHER PUBLICATIONS

Gahler, André, et al. "Direct Laser Sintering of Al2O3?SiO2Dental Ceramic Components by Layer-Wise Slurry Deposition." Journal of the American Ceramic Society, vol. 89, No. 10, 2006, pp. 3076-3080., doi: 10.1111/j.1551-2916.2006.01217.x. (Year: 2006).*
Mühler, Thomas, et al. "Slurry-Based Additive Manufacturing of Ceramics." International Journal of Applied Ceramic Technology, vol. 12, No. 1, 2015, pp. 18-25., doi:10.1111/ijac.12113. Date Information 1 (Year: 2013).*
Mühler, Thomas, et al. "Slurry-Based Additive Manufacturing of Ceramics." International Journal of Applied Ceramic Technology, vol. 12, No. 1, 2015, pp. 18-25., doi:10.1111/ijac.12113. Date Information 2 (Year: 2013).*
Mühler, Thomas, et al. "Slurry-Based Additive Manufacturing of Ceramics." International Journal of Applied Ceramic Technology, vol. 12, No. 1, 2013, pp. 18-25., doi:10.1111/ijac.12113. Default Bibliography Example. (Year: 2013).*
Farkas, Jordan P., et al. "Five Parameters You Must Understand to Master Control of Your Laser/Light-Based Devices." Aesthetic Surgery Journal, vol. 33, No. 7, 2013, pp. 1059-1064., doi: 10.1177/1090820x13501174. (Year: 2013).*
Mühler, Thomas, et al. "Slurry-Based Additive Manufacturing of Ceramics." International Journal of Applied Ceramic Technology, vol. 12, No. 1, 2015, pp. 18-25., doi:10.1111/ijac.12113. Article Highlight Date Information (Year: 2013).*
"Infrared." Wikipedia, Wikimedia Foundation, May 27, 2015, web.archive.org/web/20150527104425/en.wikipedia.org/wiki/Infrared. (Year: 2015).*
Tang H H, et al.; "Ceramic laser gelling"; Journal of the European Ceramic Society; Feb. 2005, pp. 627-632; vol. 25, Issue 5; Elsevier Science Publisher; XP027618264; ISSN: 0955-2219.
Thomas Muehler, et al.; "Slurry-Based Additive Manufacturing of Ceramics"; International Journal of Applied Ceramic Technology; May 2013; pp. 18-25; vol. 12, Issue 1; The American Ceramic Sociaty; DOI: 10.1111/ijac.12113; ISSN: 1546-542X.
Tian, et al.; "Rapid prototyping of porcelain products by layer-wise slurry deposition (LSD) and direct laser sintering"; Rapid Prototyping Journal; 2012; pp. 362-373; vol. 18, Issue 5; Emerald Group Publishing Limited DOI:10.1108/13552541211250364; ISSN: 1655-2546.
Andre Gahler, et al.; "Direct Laser Sintering of Al2O3—SiO2 Dental Ceramic Components by Layer-Wise Slurry Deposition"; Journal of the American Ceramic Society; Aug. 2006; pp. 3076-3080; vol. 89, Issue 10; The American Ceramic Society; DOI: 10.1111/j.1551-2916.2006.01217.x; ISSN: 0002-7820.
Günster et al.: "Forming of complex shaped ceramic products via layer-wise slurry deposition (LSD)", Bull. Eur. Ceram. Soc., (2003), vol. 1, pp. 25-28.

Tian et al.: "Process parameters analysis of direct laser sintering and post treatment of porcelain components using Taguchi's method", J. Eur. Ceram. Soc., (2009), vol. 29, pp. 1903-1915.
Löschau et al.: "Prototyping of Complex-Shaped Parts and Tools of Si/SiC-Ceramics by Selective Laser Sintering", Ceramics: Getting Into The 2000's, 9th Cimtech-World Ceramics Congress, (1998), vol. B, pp. 567-573.
Lonne et al.: "Surface densification of porous ZrB2-39 mol.% SiC ceramic composites by a laser process", J. Eur. Ceram. Soc., (2012), vol. 32, pp. 955-963.
Bertrand et al.: "Ceramic components manufacturing by selective laser sintering", Appl. Surf. Sci., (2007), vol. 254, pp. 898-992.
Zocca et al.: "Selective laser densification of lithium aluminosilicate glass ceramic tapes", Appl. Surf. Sci., (2013), vol. 265, pp. 610-614.
ASTM F2792-12a—Standard Terminology for Additive Manufacturing Technologies 1,2, ASTM, USA, (2012).
Jensen: "State-of-the-Art of Different Available and Coming RP-Systems", Proceedings of 2nd Scandinavian Rapid Prototyping Conference, Exibition and Course, Aarhus, 1993.
Sheng: "On Triangulating Surface Model for SLA", Proceedings of 2nd International Conference on Rapid Prototyping, Dayton, Ohio, Jun. 23-26, 1991.
Lakshminarayan et al.: "Solid Freeform Fabrication of Ceramics", Proceedings of the Symposium on Synthesis and Processing of Ceramics, Fall Meeting Material Research Society, Boston, Mass, Dec. 2-6, 1991.
Nelson et al.: "Model of the selective laser sintering of Bisphenol-A polycarbonate", Ind. Eng. Chem. Res., (1993), vol. 32, pp. 2305-2317.
Cooke et al.: "Anisotropy, homogeneity and ageing in an SLS polymer", Rapid Prototyping Journal, (2011), vol. 17, pp. 269-279.
Pickering: "Rapid prototyping turns to PM for new solutions", Met. Powd. Rep., (1995), vol. 50, No. 3, pp. 30-33.
Machlis, S., "Cubital Claims Advantages Over Stereolithography", Design News, (1990), vol. 30.
Jacobs: "Rapid Prototyping & Manufacturing—Fundamentals of StereoLithography" Dearnorn, SME (1992).
Griffith et al.: "Freeform Fabrication of Ceramics via Stereolithography", J. Am. Ceram. Soc., (1996), vol. 79, pp. 2601-2608.
Yardimci et al.: "Conceptual framework for the thermal process modeling of fused deposition", Rapid Prototyping Journal, (1996), vol. 2, pp. 26-30.
Feygin et al.: "Laminated Object Manufacturing (LOM): A New Tool in the CIM World", Proceedings of PROLAMAT 1992, Tokyo, Japan, Jun. 1992.
Griffin et al.: "Desktop Manufacturing: LOM vs Pressing", Am Ceram. Soc. Bull., (1994), vol. 73, pp. 109-113.
Melcher: "Rapid Prototyping von Keramiken durch 3D-Drucken", Dissertation, Erlangen, 2009—English abstract on p. 130.
Ebert et al.:"Direct inkjet printing of dental prostheses made of zirconia", J. Dent. Res, (2009), vol. 88, No. 7, pp. 673-676.
Haase, B: Stereolithography at Chrysler Motors, Microcad News, [8], Aug. 1990.

* cited by examiner

METHOD FOR THE ADDITIVE LASER-INDUCED PRODUCTION OF A MAIN PART BY MEANS OF SLIP CASTING

BACKGROUND OF THE INVENTION

Field of the Invention

The invention relates to a process for the mold-free construction of three-dimensional green ceramic bodies. Processes of this type are also termed generative processes and are classified as additive manufacturing processes.

A known slip-based process is the layer-by-layer slip deposition (LSD) process. This process applies green ceramic layers in succession by way of a procedure analogous to film-casting, and uses a laser for local sintering of same—in accordance with the principle of selective laser sintering (SLS) [1-3].

Commercially available generative manufacturing processes for ceramic components use a proportion of up to 60% by volume of binder phases in the slip composition. Use of these is essential for optimizing the generative process. These binder phases are by way of example crosslinkable resins which when uncrosslinked function as a liquid phase and when crosslinked function as an adhesive for the ceramic particles, e.g. in stereolithography. As a very general rule, for reasons associated with the quality of the component, conventional ceramic compositions which have only low proportions of organic additives (for which the term "organics" is usually used by those skilled in the art and is also used hereinafter) below 3% by volume, based on the ceramic slip, and which are therefore significantly less expensive, cannot be used for, or have only very restricted use for, additive manufacturing processes. There is currently only a restricted choice of processes that permit production of ceramic components of sufficient quality from purely ceramic powders or compositions [3-7]. Nor is there any known additive process for the construction of sinterable green ceramic bodies which are comparable with green bodies produced by conventional means. Examples of conventional production of green ceramic bodies are centrifugal casting and pressurized slip casting.

In the light of the above, a process as claimed is proposed.

SUMMARY OF THE INVENTION

In a first embodiment, the process proposed for the additive manufacture of a green ceramic body comprises the following steps:
provision of a slip comprising, suspended in a liquid phase, particles of a structure-forming ceramic material;
production of a slip layer from the slip provided, or production of a slip layer;
direction of radiation from a laser light source onto a slip-layer section;
vaporization of liquid phase from the slip layer in the slip-layer section onto which the radiation from the laser light source is or has been oriented—in other words selective section-by-section laser-induced vaporization of the liquid phase of the slip layer;
sinter-free formation of a section of the green ceramic body in the slip layer;
optional repetition of the steps of production, direction, vaporization and sinter-free formation until the green ceramic body is obtained;
separation of the green ceramic body from the slip.

The expression "structure-forming ceramic material" means in this context the entirety of slip constituents which form, after the sintering procedure, the ceramic of the sintered component. These consist essentially of suspended solid particles. The liquid phase typically comprises water and auxiliaries dissolved therein, for example the dispersing agents, antifoams, and/or binders, etc. that are usually used for a conventional water-based ceramic slip. The liquid phase can also, however, optionally comprise an alcohol or an aprotic solvent. That is particularly advantageous if the structure-forming ceramic material or a constituent of the structure-forming ceramic material undergoes undesired changes or reacts on contact with water. The process proposed is therefore expressly not restricted to aqueous slips. The local laser-induced vaporization of the liquid phase is attended by local compaction of the disperse phase, i.e. of the structure-forming ceramic material. In another form of this embodiment, the extent, measured in a plane of the slip layer, of the section of the resultant sinter-free green ceramic body is larger than the corresponding size of the slip-layer section onto which the radiation from the laser light source was directed.

Advantages of the process proposed comprise reduced time and cost required for the production of green bodies with properties corresponding to those of an industrially manufactured green body produced by conventional slip-casting processes. The green body is produced in the process from conventional industrial aqueous ceramic slip which has low content of organics (>3% by volume) or is practically free from organics. The expression "practically free from organics" means here that content does not exceed the content of possible organic impurities in technical-quality ceramic materials typically used.

In another embodiment, the process moreover comprises the following step:
drying of the green ceramic body.

The green body advantageously has identical residual moisture content throughout, so that drying appropriate to the geometry of the green body can achieve essentially uniform drying shrinkage, and cracking can be reliably avoided.

In another embodiment, the proportion of the structure-forming ceramic material in the slip is at least 60% by volume, preferably up to 65% by volume, in particular up to 70% by volume or up to 74% by volume.

The consistency of this type of slip is advantageously gel- or paste-like, so that convection in the slip bed is reliably prevented and, during the entire process, mechanical support is reliably provided to the structure of the green body formed stepwise with exposure to the laser radiation.

In another embodiment, the proportion of organic and/or inorganic auxiliaries in the slip is up to 5% by volume, preferably at most only 3% by volume, more preferably at most 1% by volume. The ceramic slip used ideally comprises no organic auxiliary materials of any kind. That renders the time-consuming and expensive binder-removal steps for known additives or in known generative processes obsolete.

In another embodiment, the proportion of organic auxiliaries in the slip, in particular organic dispersing agents dissolved in the liquid phase, antifoams, binders, etc., does not exceed a proportion of 3% by volume and/or the aqueous slip used is practically free from organic solvents and all types of organics. In an alternative to the latter, the liquid phase comprises an organic solvent that can be vaporized to leave no residue. The expression "practically free" here means that content does not exceed the content of possible organic impurities in technical-quality materials typically used. The expression "to leave no residue" is used correspondingly: the quantity of a residue remaining after the vaporization procedure is either zero or else negligibly small, because organic solvents used are practically free from impurities and also comprise no organics in the sense of this text—i.e. are free from wetting agents, binders, dispersing agents, antifoams, flow aids, plastifiers and/or other additives.

The above advantageously permits the production of a green body that is also practically free from organics or at least has low content thereof. There is therefore no longer any requirement for a separate binder-removal step before the sintering procedure. Slips having low contents of organics or practically entirely free from organics are inexpensive, because an organic addition per se incurs materials costs significantly higher than those of a conventional industrial ceramic slip with only a small proportion of organics, for example dispersing agents, antifoams, binders, etc., where content of these is typically below 5%, for example below 3%.

In another embodiment, the thickness of the resultant slip layer is selected from a thickness in the range from 25 μm to 2 mm, from 50 μm to 1000 μm, or from 100 μm to 750 μm or assumes a value from 100 μm to 600 for example 500 μm.

Advantages result from the high precision and surface quality achievable in the resultant green body in accordance with the structure of the virtual slice model on which the control of the laser irradiation device is based. Slip layers of different thickness can be mutually superposed and respectively subjected to laser-induced structuring, as required by the geometry of the desired green body.

According to another embodiment, the configuration of the laser light source is such that it emits radiation in the wavelength range from 520 nm to 10 μm. The meaning of the expression "laser light source" here is a laser light source capable of directed emission of coherent light of a predetermined wavelength.

Advantages result from the wide range of commercially available laser light sources, solid-state lasers, gas lasers, laser diodes, high-power laser diodes, fiber lasers, excimer lasers, lasers emitting in the IR or NIR wavelength range, $CO_2$ lasers, and also of optical equipment and control elements (diaphragms, shutters, mirrors, etc.) that can be used for directional control, modulation, deflection or guidance of same. The configuration of the laser light sources and/or associated control elements and/or optical devices here are such that the laser energy emitted in each case is incident on the slip layer continuously or in form of pulses. This gives great flexibility of parameters for the optimization of the process (e.g. wavelength, power, power density, pulse frequency, advance velocity, or the residence time of a laser spot on or in the layer.

In another embodiment, the configuration of the laser light source is such that radiation at least of a wavelength in the wavelength range from 600 nm to 3 μm is emitted. Alternatively and/or additionally, the configuration of the laser light source is such that the greatest possible proportion of the laser radiation incident on the slip layer is input directly into the liquid phase of the slip, i.e. into the water in the case of water-based slips. The liquid phase is thus heated and vaporized. The word "input" here means that the laser energy is absorbed by the liquid phase or the dispersion medium. It is preferable that at least more than 1%, for example more than 30%, in particular more than 50%, of the incident laser power is absorbed by the respective liquid phase present and lead to locally restricted vaporization thereof.

Advantages of this embodiment arise from the capability for appropriate adaptation to different, and optionally differently colored, structure-forming ceramic materials of the slip. It is possible to select a laser, or a laser-radiation wavelength range appropriate for the local heating of the slip layer, permitting essentially selective heating of the liquid phase and therefore vaporization thereof, while the particles of the structure-forming ceramic material are only insignificantly heated, and are never sintered.

In another embodiment, the selection and/or configuration of the laser light source is such as to permit emission of radiation at least of a wavelength in the wavelength range of 1970 nm±100 nm.

Advantages result from the commercial availability by way of example of thulium fiber lasers which are appropriately adapted for input of an adjustable energy level with sufficient energy density into aqueous fluids, for example a ceramic slip layer.

In another embodiment, the laser light source is selected from a NdYAG laser, a Thulium fiber laser and/or a laser diode.

Advantages arise by way of example from the greater ease of operation of a fiber laser in traversing distances which can also be large, for example traverse distances of a laser spot amounting to >1 m on/in the slip layer.

In another embodiment, the step of "direction" comprises focusing of laser radiation onto or into the slip layer. Alternatively and/or additionally, a directed and/or focused laser beam is guided along an exposure trace which proceeds on or in the slip layer. In another optional form of this embodiment, the position of the focus here can be changed or varied not only laterally in a plane of the layer but also orthogonally thereto.

Advantages arise from the specific appropriate adjustment of the wavelength of the laser radiation used and of the power applied and, respectively, of the achievable penetration depth and, respectively, of the effective input of the incident laser power into the liquid phase of the ceramic slip with the respective absorption coefficient of the liquid phase and the respective absorption coefficient of the constituents of the structure-forming ceramic material and/or the proportion of scattered light in the wavelength range concerned for the prevailing average particle size distribution of the structure-forming ceramic material. This appropriate adjustment enables locally selective vaporization of the liquid phase, while the structure-forming ceramic material undergoes laser-induced compaction with resultant gradual formation of the entire green body.

In another embodiment, the exposure trace can be represented at least in sections by a continuous and/or interrupted line.

Advantages arise by way of example from the resultant design freedom.

In another embodiment, the exposure trace can be represented at least in sections as lattice, as grid, as spiral, as ellipse, as circle, as group of lines and/or as pattern. The word "pattern" here means a periodic arrangement of geometric elements or at least some extent of repetition of individual geometric elements.

Advantages arise from the accelerated manufacture of cross sections of the green body, inclusive of cross sections with large dimensions.

In another embodiment, the dimension of oriented and/or focused laser radiation—usually termed laser spot—on the surface of the slip layer at least in one direction is in the range from 25 μm to 25 mm, in particular in the range from 40 μm to 10 mm, preferably in the range from 50 μm to 5 mm, more preferably in the range from 100 μm to 3 mm. It is also possible here that an edge length or a diameter comprises one of the boundary values of these ranges.

Specific advantages thus achievable relate to the possibility of laser-induced production of green bodies/green-body sections having filigree structures, as well as those having no fine structure.

In another embodiment, the velocity with which the directed and/or focused laser radiation moves on or in the slip layer is in the range from 1 mm/s to 20 m/s.

Advantages arise directly from the high achievable processing rate in the structuring of slip layers, inclusive of those having large dimensions.

In another embodiment, the vaporization procedure according to the process brings about an attractive interaction between particles of the structure-forming ceramic material and/or sinter-free formation of the green-body section in the slip layer, where the liquid phase—even if it is present in excess—cannot achieve resuspension of the particles forming, via agglomeration, the green-body section. The laser-induced vaporization procedure thus produces a fragment.

Results include not only technological simplification but also cost advantages, for example, due to the possibility of using, in the process, inexpensive slips that are conventionally used in industry and are otherwise used for conventional slip casting—for example, with a plaster mold.

In another embodiment, after the "vaporization" step the liquid phase flows, driven by capillary forces, from surrounding regions of the slip bed into the particle aggregate and/or into the slip-layer section onto which the radiation from the laser light source is or has been directed.

As a result of the above, immediately after the resultant green body is removed from the slip bed it has a certain moisture content and requires drying before the sintering procedure. Advantages of this embodiment consist in pore-size-dependent cooling of the resultant green-body structure. If, by way of example, the laser energy is input in pulses into the liquid phase, excessive heating of the solid fraction of the ceramic slip can be avoided, and any premature sintering of central parts of the green-body structure can be prevented. The sinter-free production of the green body reliably avoids stresses during the drying procedure and resultant cracking.

In another embodiment, the nature and/or the course of the exposure traverse is/are derived or determined from data relating to a virtual model of the green body, with the aid of what is known as a model slice method.

Specific advantages comprise the direct coupling of a computer-assisted/model-based design process (CAD) to the manufacturing procedure.

In another embodiment, the slip layer includes at least an area of 100 mm².

The process is therefore advantageous not only for the manufacture of a single unit (prototype) but also for the manufacture of large numbers of units, i.e. for direct industrial manufacture. By way of example, with the enlargement of the areal extent of the slip layer it is possible to achieve parallel production of large numbers of units of identical, or else differently shaped, green bodies.

In another embodiment, the projection area of the exposure trace for the sinter-free formation of a green-body section in the slip layer on the slip layer or in a plane of the slip layer is at most half as large, preferably at most one third as large, as the area of the cross section, in a plane of the slip layer, of the respective green-body section generated by the laser-induced procedure.

Scribing of complete cross sections or of complete exterior outlines of the desired component—a requirement of other laser-assisted structuring techniques—is therefore advantageously no longer needed.

In another embodiment, the density of the green body obtainable by the process reaches at least 55% of the density of a pore-free solid body comprising the structure-forming ceramic material.

By way of example, the pore volume of the green body obtained by a laser-induced procedure is not more than 40%, preferably not more than 35%, of the total volume of the green body defined by its exterior outlines. The density of the green body generatively produced by a laser-induced procedure with use of the additive production process described is therefore advantageously the same as that of a green body produced conventionally from a purely ceramic composition. Sintering of the green body thus provides a high-density ceramic component which in practical terms does not differ in respect of its thermomechanical properties from a sintered body of a green body manufactured conventionally by means of slip casting. There is therefore then no requirement to provide a mold.

The embodiments described can be combined with one another in any desired manner.

Surprisingly, it has been found that selectively sectional exposure of a slip layer produced from ceramic slip to laser radiation leads, site-selectively at the exposure site, to irreversible compaction of the structure-forming ceramic material of the slip layer as a result of local vaporization or local removal of the liquid phase of the ceramic slip. The slip-layer region compacted here by a laser-induced procedure extends over the dimensions of the exposed section of the slip layer, not only laterally—in the plane of the layer—but also orthogonally—through the thickness of the layer(s). However, the structure-forming ceramic material is not sintered here either during exposure to the laser radiation or during the associated compaction. Instead, the fine structure of the locally compacted section of the slip layer corresponds to the typically fine structure of a green ceramic body: it has the pores typical of green ceramic bodies, resulting from compact packing of the original ceramic-slip particles with unchanged geometry. As exposure on the slip layer to radiation continues, the dimensions of the computed section of the slip layer increase, and the green body continues to grow. If the exposure region is shifted, for example in that the focus of the radiation directionally emitted from the laser radiation source is moved continuously onwards on or in the slip layer, the resultant green body also exhibits continuous further growth in accordance with the motion of the laser beam. This procedure forms the basis of the laser-based generative production process proposed. Another possibility is non-continuous exposure of a selected region of the slip layer in order to generate a green-body section extending continuously in a slip layer. For this, the laser beam is repeatedly directed onto the same regions of, or closely mutually adjacent regions of, the slip layer.

The process described above is similar to the processes described in [1] and [2] in that it uses a ceramic slip for the layer-by-layer construction of a component. However, the slip for the respective layer is not dried, but instead is directly locally heated with the aid of a laser after each application of a layer of highly filled slip. The expression "highly filled slip" means in this context a ceramic slip with a proportion of 60% by volume, 70% by volume, or indeed 74% by volume, of ceramic solids. Local heating of the slip layer results in local vaporization of the liquid phase of the slip, i.e. water in the case of water-based slips, at the location heated by means of laser radiation in the layer.

To this end, the laser energy is preferably input into the liquid phase, so that the ceramic particles themselves are not significantly heated, and the sintering temperature of any constituent of the respective ceramic material is never reached. The local vaporization of the solvent brings about local formation of a green body, in particular at least formation of a section of the complete future green body which is constructed by a successive, layer-by-layer method and which can be sintered to give the finished component after drying and removal from the slip bed.

After the laser has been switched off, therefore, a section of the green body is present at the location of the layer locally exposed to the laser, and cannot be re-dissolved by the surrounding slip which remains liquid in the slip layer.

The energy of the laser radiation introduced locally into the slip layer is set at a level that prevents any sintering of the ceramic particles. To this end, the wavelength of the laser light source(s) used is selected so that the energy is preferably input (absorbed) into the solvent, and not into the ceramic slip particles. The wavelength of laser radiation suitable for the process proposed is in the range from 520 nm to 10 μm. It is preferable that the wavelength of the laser light source (e.g. laser, laser diode) is in the region of the near infrared, for example from 600 nm up to the range from 800 nm to 3 μm. Preference is given to wavelengths at which the laser energy is readily input into water. A laser wavelength around 1300 nm or around 1970 nm has proven to be particularly advantageous. The word "around" is intended here to comprise a range from plus/minus 100 nm, in particular a range of plus/minus 50 nm.

Shorter wavelengths here can achieve higher resolution in the structure of the resultant body, but a higher wavelength has a correspondingly higher depth of penetration into the slip layer. The process proposed is moreover characterized by setting of the following parameters appropriately for the respective layer thickness of the slip layer: the wavelength used, the intensity of the laser radiation used, the dwell time of the laser beam at the selected section of the slip layer, and therefore the total locally input energy.

Another form of the process proposed is characterized in that the respective preferred wavelength is set appropriately for a color of the ceramic composition, in particular for a color of ceramic particles. It is advantageous here to minimize input of the laser energy into solid constituents of the slip layer and to increase input into the liquid phase of the slip, or into the suspension medium, or into the liquid which in practice is termed solvent.

In an embodiment, a dye is added to the solvent and increases input of the energy of the laser radiation used into the liquid phase of the slip layer.

As a result of the solvent removal brought about by the vaporization or evaporation, the distances between the particles in the green body are reduced to an extent such that attractive interaction arises between neighboring particles, and for this reason the green body cannot be re-dissolved by the solvent surrounding same. The very short distances between the particles in the green body contrast with the condition of the slip particles in the suspension.

In the suspension, or in a slip-layer section not treated with laser light, a repulsive interaction exists between the particles. The stability of the suspension depends on this repulsion between the particles. The repulsive interaction between the slip particles inhibits sedimentation of the particles from the suspension. The usual method of stabilizing a slip uses small quantities of organic and/or inorganic additives. The additives result in formation of a layer made of a plurality of molecular sublayers of the solvent and/or of organic and/or inorganic long-chain molecules ("steric stabilization"), or a layer made of a plurality of sublayers of charged molecules of the solvent and/or made of molecules of the additive ("electrostatic stabilization").

The laser-induced local vaporization of the solvent from the slip layer, e.g. of water—if an aqueous slip is involved—causes collapse of these stabilizing layers. A repulsive interaction of the particles of the suspension (of the slip) thus becomes an attractive interaction. This results in formation of a particle aggregate (solid) in regions of the slip layer subjected to laser-induced destabilization.

The subsequent application of a further slip layer and then the sectional (local) vaporization of the solvent from this further layer can therefore achieve successive construction of a complete green body (component).

In other words, progressive laser-induced growth of a particle aggregate, with progressive laser-exposure of the respective slip layer provided and of the further slip layers optionally subsequently applied thereto, forms a green body layer-by-layer in a slip layer or in a slip bed optionally formed layer-by-layer from slip.

According to the process, therefore, sections of a green body formed by a laser-induced procedure are formed layer-by-layer in accordance with a final green-body shape that can be prescribed by a control program on the basis of a slice method, and no casting mold is required for this purpose. The process proposed is therefore mold-free.

In a practical embodiment, the slip layer provided was composed of a conventional industrial aqueous ceramic slip (the proportion of the solid structure-forming ceramic material in the slip being 70%) with lateral dimensions of 100×100 mm and thickness 100 μm. A thulium fiber laser appropriately set to provide laser power in the range from some tens to some hundreds of watts in the wavelength range from 1800 nm to 2100 nm is configured to permit local exposure of the slip layer at a wavelength of 1970 nm and 50 watts with a variably selected spot size, an example being an essentially round spot of diameter 100 μm. The selected area of the slip layer is then exposed to the laser radiation at 1970 nm with pulse frequency from 50 to 100 Hz. The pulses are generated by repeated traversing of a scanning pattern by the laser beam on the layer surface. The total laser-spot dwell time required at the exposed section of the slip layer in order to complete formation of the corresponding green-body section produced by the laser-induced procedure was typically in the range up to 10 seconds. The laser power introduced, bringing about the heating and vaporization of the water from the slip layer, leads to compaction of the initially disperse phase, i.e. of the structure-forming ceramic material. A sinter-free green-body section is thus formed in the slip layer directly at the site of, or in the region of, the exposure scanning pattern. The enthalpy of vaporization of the liquid phase advantageously brings about cooling of the structure-forming ceramic material at the exposed section of the slip layer, and the resultant temperature therefore reliably remains below the sintering temperature of the structure-forming ceramic material, even though it may at first glance appear that a large total quantity of energy is locally introduced into the slip layer.

The areal dimensions of the slip layer here are generally not subject to any restrictions. A uniform layer thickness across the entire areal extent of the slip layer is typically preferred because this permits direct use of control data generated by means of a virtual slice method for the CAD-based manufacture of components generated by an additive layer-by-layer procedure.

The ceramic slip is typically applied by a doctor in the form of a slip layer of uniform thickness throughout on a substrate which can be lowered continuously or in prescribable steps. It is also possible that the slip is applied only sectionally on the substrate or on the previously applied layer. It is also possible that slip applied only sectionally, for example by a doctor, is formed into a coherent layer and thereby smoothed. In an embodiment, a subsequent slip layer can be applied exclusively on a green-body section previously produced by a laser-induced procedure in the slip.

A typical thickness of the resultant layer is in the range from 25 μm to 2 mm, for example in the range from 50 μm to 1000 μm, in particular in the range from 100 μm to 750 μm, and can by way of example be 500 μm. Deviation from the established layer thickness is typically below 10%, preferably below 5%, of the nominal value of the layer thickness, typically being less than 10 μm.

The laser radiation can be guided to the layer section requiring treatment by suitable scanner optics, or else by way of example by a quartz fiber, for example a multimode quartz fiber. A device such as a laser plotter, or the add-on equipment with relevant unit for monitoring and control of an appropriate plotter, can be adapted appropriately to implement the process proposed. Guidance of the laser energy by means of fiber optics or optical waveguides advantageously provides particular technological flexibility. It is also possible that radiation emitted from a laser light source is directed and/or guided by a system comprising mirrors, shutters, modulators and/or other laser-optic components onto or into the slip layer.

In one or more preferred embodiments, it is proposed that the slip bed, in particular the respective last-applied slip layer, is treated serially by a laser light source and/or in parallel by a plurality of laser light sources. It is also possible that the energy of a laser is split in suitable manner and input into the liquid phase of the solvent of the ceramic slip of the slip layer at different, respectively predetermined, sections of the layer.

Advantages arise from a shortening of the processing time required for the structuring of a slip layer.

The size of the laser spot respectively applied is in the range from 40 μm to 10 mm, preferably in the range from 50 μm to 5 mm, for example in the range from 100 μm to 3 mm. The total laser energy required here for the locally restricted vaporization of the solvent can be introduced over a single continuous period, or else over a plurality of time-shifted periods repeatedly (non-continuously).

The laser beam is directed onto the slip layer in the form of, for example, a spot or line or an area. Spots and lines are by way of example technically easy to produce with the aid of a suitable scanning device (scanner optics) which can move a laser spot across the layer in a controlled manner. It is also possible to use at least one fiber laser. When the layer is irradiated with a guided laser beam in the form of spot or line, the solvent is initially vaporized in a very small areal region. Once this layer is fully dried, solvent flows from the slip that remains liquid, driven by capillary forces, into the dry regions. The laser-induced procedure thus forms a green body radially around a laser-exposed spot or laterally along a laser-irradiated line of the slip layer in two dimensions in the plane of the layer. The laser-induced procedure likewise forms the green body within the thickness of the slip layer, perpendicularly to the plane of the layer.

The formation of the green-body region advantageously continues across the entire layer thickness and, if a green-body section has already previously been formed below the region that is currently drying, produces a connection thereto. The resultant green body can also extend beyond the thickness of the layer into the slip bed if there has not yet been any green body present in that region and the local heating of the slip bed by the laser beam is maintained for a sufficient time.

If the intention is to produce an area situated in the plane of the slip, for example a base or a surface section of the future component, the laser energy can be guided as required by the areal extent and outline of the area concerned. By way of example, for a round area it can be guided along a spiral course surrounded by the outline of the area. It is also possible to guide the laser energy to generate lines in a lattice. By way of example, the laser beam can be conducted onto the relevant section of the layer in the following ways: along parallel lines, or so as to generate intersecting lines, or so as to generate a grid, or else so as to generate a spot lattice or any desired other lattice of geometric shapes with or without mutually sectionally overlapping sections.

The trace of the laser beam on and/or in the slip layer is therefore at least sectionally selected from an arrangement of intersecting lines, an arrangement in the form of a grid, an arrangement in the form of a spot lattice, or an arrangement involving any desired other lattice of geometric shapes with or without mutually overlapping or intersecting sections.

The laser beam here can be a focused beam, and the location of the focus can be on the surface of the layer or within the layer, for example within a plane of the layer.

The at least one laser beam used can be operated in pulsed or continuous mode. A laser-beam focus here, located on or in the layer, can by way of example be moved in sections with a velocity in the range from 1 mm/sec to 20 mm/sec. Advantages arise from the accelerated structuring of a slip layer and from the almost immediate onset of, and then, after the passage of the laser beam, continuation of, formation of the green-body structure. The dwell time of the laser beam on or in the layer can be varied dynamically during the manufacturing process. The dwell time is advantageously adjusted to the desired vertical and/or lateral extent of a section of the required green body. If, by way of example, the intention is continuous section-by-section increase of the thickness of a wall formed by a laser-induced procedure, the dwell time of the laser beam along the exposure trace is increased section-by-section or the same section of the layer is subjected to repeated laser-exposure.

An intrinsic feature of the underlying principle of the laser-induced reduction of distances between neighboring slip particles, and of the attendant hardening of sections of one or more slip layers to give sections of the green body is that, unlike in known laser-based processes, there is no scribing of the entire cross section of a structure. Another difference from other laser-assisted processes is that the laser is not used to scribe the exterior outline of the required solid-body layer, but instead to scribe one or more interior lines, for example a central line of a cross section of the required structure.

By way of example, a green body in the form of a tube of prescribed wall thickness standing in the slip bed is produced by scribing, for each layer, merely a circle, rather than the face area of the tube.

The line scribed by the laser here can be coherent or continuous, but can also be a dotted, dashed, or by way of example a "dotted and dashed" line. If the tube is to have a relatively high wall thickness, for example in the range around 1 cm, it is also possible, with appropriate energy density of the laser beam, to structure the layer by using a laser spot of 50 μm diameter, and two or more concentrically guided circular courses of the laser beam.

Once the construction process has been entirely concluded, the component takes the form of a moist green body surrounded by slip. The remainder of the slip surrounding the hardened sections is, like the slip originally used, liquid or gel-like, and can be separated by decanting or suction-removal, in a manner similar to that in stereolithography processes, from the component formed in the laser-induced procedure. This slip can advantageously be returned to the manufacturing process for another green body.

A sintered component is produced by drying and firing of the green body removed from the slip bed. The drying procedure can advantageously be controlled via active convection to prevent damage to the green body by the shrinkage that occurs during the drying procedure.

Because conventional industrial slips are used, comprising only small proportions (less than or equal to 3% by weight) of organics, the structural condition of the green body additively constructed by a laser-induced procedure is comparable, or identical, with that of a conventionally produced green body. The slip also comprises only small proportions of inorganic auxiliaries, which do not require removal in a separate binder-removal process for the firing procedure. The firing step can therefore take place under conditions (temperature, time) which are comparable, or identical, with those conventional in industry. The advantages are clear: reduced production costs due to use of substantially less expensive ceramic slips, reduced energy costs due to omission of binder-removal step, reduced manufacturing cost due to shorter process time, direct coupling of the rapid prototyping procedure to industrial manufacture, and problem-free scalability of the process.

Advantages of the process proposed arise against the background of the increasing requirement for prototypes for manufacturing industry and of the increasing complexity of the prototypes required, and also in the light of the requirement for a manufacturing procedure that reacts flexibly to current requirements and that can also handle large batch sizes. A large number of novel technologies have appeared under the heading of "rapid prototyping", "rapid manufacturing" or "additive manufacturing" which can be used to respond to the demand for greater flexibility in manufacturing. The significant features of these processes are the generation of process-control data from CAD geometry data and the subsequent control of operational equipment. The following features are shared by all of these processes [8-10]:

1) Shaping is not achieved via ablation of material, but instead via addition of material, or via the liquid-to-solid phase transition of a material. Compaction of a pulverulent starting material can also occur.
2) Almost all processes construct partial geometries from layers of finite thickness directly from CAD data, where the layers are realized virtually via a slice method. The processes available nowadays differ in the initial condition of the materials (solid, liquid, gaseous) in the layer-addition procedure or in the construction process.

Whereas in the 1980s and 1990s a large number of different processes were developed for additive manufacture, and efforts were concentrated on flexibility in the design of prototype components, the focus of current research activities is now the manufacture of components with optimized properties. In accordance with this development, the terminology for these technologies has changed: originally "rapid prototyping", it is now "additive manufacturing".

Along the processes most widely used are:

Selective laser sintering (SLS) was originally developed for powders made of nylon, polycarbonate and waxes, and was subsequently transferred to metal and ceramic powders. Powder layers are locally sintered or fused in a reactor, where lasers are used to reach the melting point [11-13].

In multiphase jet solidification (MJS), metal-powder-binder mixtures are processed in a manner similar to that in the injection-molding process via computer-controlled displaceable nozzles to give layers which then in turn construct the component [14].

Stereolithography uses liquid UV-sensitive polymers as starting materials which harden locally in a layer as a result of laser irradiation [15-18].

Solid ground curing (SGC) likewise uses liquid polymers as starting material [14]. After UV-irradiation, thin polymer layers cure at the exposed sites, and the component is constructed layer-by-layer.

Simultaneous shot peening (SSP) is the term used for a process in which the surface of a desired shape is replicated via spraying with liquid metal [14]. This replication can by way of example serve as part of an injection mold or of a press mold.

Fused deposition modelling (FDM) is very similar to the multiphase jet solidification (MJS) process [19]. An NC-controlled nozzle is passed across the desired workpiece, the weight of which can be adjusted. The component is constructed via layer-by-layer deposition of molten material and appropriate lowering of the platform [14].

Laminated object manufacturing (LOM) was originally developed for the production of components made of paper or plastic. From individual layers of material, a laser cuts the appropriate component layers, which are laminated together with use of adhesives to give the workpiece [20]. The LOM process is described in [21] for the example of $Al_2O_3$, where ceramic foils, themselves produced by the doctor-blade process, are cut to size with the aid of a laser.

The process of layer-by-layer slip deposition (LSD) applies green ceramic layers by way of a process similar to film casting and uses, as does selective laser sintering (SLS), a laser for the local hardening/sintering of the green ceramic layers [1-3].

Indirect 3D printing uses metallic or ceramic powders or polymer powders for the application of layers which are then hardened by local injection of a binder. Technologies comparable with that of inkjet printing are used for the injection of the binder [22].

Direct 3D printing uses particle-loaded suspensions which are applied locally, layer-by-layer, onto a substrate through a nozzle by means of printing-head technologies comparable with those used in an inkjet printer, and which lead to solid powder structures (green bodies) via vaporization of the solvent. This process leads to relatively high densities in the powder structures (high green density), but is not suitable for inexpensive production of relatively large bodies [23].

None of the rapid prototyping processes known hitherto is suitable for the generation of green bodies which are comparable with a conventionally produced green body. With known RP processes it is particularly difficult, or completely impossible, to generate large-volume green bodies. Green bodies with properties different from those of a conventionally produced green body generally cannot be used to produce ceramic components with properties comparable to those of conventionally produced ceramic components, or can be used therefor only at high technological costs. An example that may be mentioned is a green ceramic body produced by means of stereolithography. In view of up to 60% by volume of organics, this green body is better described as ceramic-filled polymer. Before the actual ceramic-sintering procedure can begin, the organics have to be driven off in an expensive and technologically complicated binder-removal process. For some component geometries, the binder-removal procedure can take several days and can lead to defects in the green body which generally cannot then be eliminated via the subsequent sintering procedure.

Because ceramic powders have low bulk density, 3D printing leads to low-density green bodies from which it is generally not possible to generate dense ceramics by means of sintering [22]. When very fine ceramic powders are used, for example in order to increase sinter activity or in order to form a particularly fine-crystalline structure of the ceramic component, this generally in fact increases the extent of these disadvantageous features.

In the LSD process, slip deposition is used to generate green layers with density comparable to that of a conventional green body. In the process described, a laser is used to scribe the layer information into the dried green layers, but the laser-sintering leads to highly anisotropic configuration of the prototype and, in some circumstances, to other undesired side effects due to an excessive local temperature increase, an example being blistering or undesired formation of glassy phases, etc. [3]. Although the laser-irradiation in the LSD process leads to local sintering of the green layer in a manner such that irradiated regions can subsequently be dissolved out of the green body by means of water, the laser-irradiated regions have properties different from those of conventionally sintered ceramics. Subsequent conventional sintering moreover cannot influence the configuration of a component constructed via LSD in a manner that produces a component with properties comparable to those of a conventionally sintered component.

Against this background, the process proposed permits generation of green bodies having properties comparable with those of a conventionally produced green body. Green bodies with properties different form those of a conventionally produced green body generally cannot be used to produce ceramic components with properties comparable to those of a conventionally produced ceramic component, or can be used therefor only at high technological cost. An example that may be mentioned is a green ceramic body produced by means of stereolithography. Stereolithography uses liquid UV-sensitive polymers as starting materials which undergo local hardening in a layer through irradiation with light. For the construction of green ceramic bodies, the UV-sensitive polymers are loaded with a ceramic powder. Hardening of the polymer produces a green body which comprises from 40 to 60% by volume of organics. The organics have to be driven off in complicated binder-removal processes before the actual ceramic-sintering procedure can begin. In the case of some component geometries, the binder removal procedure can take several days and can lead to defects in the green body which cannot generally be eliminated by subsequent sintering. It is very difficult to construct large-volume components, because removal of the organics without damage to the component is technically possible only up to a certain component thickness.

In contrast to the above, the process proposed permits use of ceramic slips comprising no organic or inorganic additives which are gelled or crosslinked by thermal or optical methods in order to stabilize the resultant green body. The pore volume of the green body produced by the process is preferably less than 45% by volume, in particular less than 40% by volume, for example at most 38% by volume.

The process proposed is characterized by layer-by-layer construction of a green body by means of layer-by-layer application of a liquid ceramic slip and local vaporization of the solvent of the slip from an applied slip layer, e.g., via local vaporization of the water in the case of water-based slips, with exposure to a laser beam. Furthermore, the process does not involve laser-irradiation of the entire area of the two-dimensional projection of the component on or in the appropriate layer, but instead involves laser-irradiation of only a fraction of said area. A green body is formed around the laser-irradiated region, because the solvent is vaporized in the irradiated region and, in a manner similar to that in conventional slip casting, solvent from the slip is sucked by capillary forces into the irradiated region. The only requirement is therefore by way of example laser-irradiation, in the form of one or more lines, for example, of a slip-layer region situated within the 2D outline of the projection of the desired component in the appropriate layer. The green body formed by the irradiation or as a result of the irradiation extends laterally from these lines and into the thickness of the slip layer by way of those regions of the slip layer and/or of the slip bed. Another characterizing feature is that said aggregation comprises no particle growth due to sintering. No sinter necks are therefore formed on exposure to the laser beam, and the average grain diameter of the structure-forming ceramic material remains unchanged. As the laser beam progresses, this green body gradually grows—initially primarily in the plane of the slip layer—and is constructed by the application of further slip layers and controlled sectional irradiation thereof by the laser beam.

An extremely large amount of time is advantageously saved by the stacking of layers of a ceramic slip without any requirement for complete drying of each slip layer here before the structuring step. Structuring of a layer is achieved via direct irradiation of the wet slip layer by means of one or more laser light sources.

The additive processes proposed can use industrial water-based slips with a small proportion of organic or inorganic additives, thus protecting the environment and reducing costs.

The green body constructed accordingly comprises only small quantities of, or no, organics, thus, as described, providing a substantially easier sintering procedure.

For generation of a component in the green-body state, it is typically not permissible to expose the bulk of the component to any heat-treatment or to load same with high concentrations of organic material.

Another reason for preferred use of ceramic compositions having only small proportions of organic additives, in particular proportions below 3% by volume, in the industrial mass production of ceramic components is that this results in lower costs.

Aspects of the process proposed therefore relate to:
1. An additive manufacturing process by means of laser-induced drying of a slip in ceramic slip layers for the production of a green body with density higher than 55% by volume of theoretical density, where the layer is laser-heated only in spots or lines and the solvent is vaporized and, through capillary-force-driven removal of the solvent, e.g., water in the case of water-based slips, in a procedure comparable to the slip casting process, a green body is formed radially around the heated spot or laterally in relation to the heated line.

2. A generative process for the production of a green ceramic body of aspect 1, characterized in that, in relation to density and strength, the green bodies generated are comparable with green ceramic bodies produced by slip casting or pressurized slip casting process.

3. A generative process for the production of a green ceramic body of aspect 1, characterized in that the green body generated comprises only a small proportion of additives, in particular a proportion below 5% by weight.

4. A generative process for the production of a green ceramic body of aspect 1, characterized in that the green body generated comprises no organic additives.

5. A generative process for the production of a green ceramic body of aspects 1-4, characterized in that a laser radiating at a wavelength that is particularly effectively absorbed by the solvent of the slip, in the case of water by way of example 1970 nm, is used as source of laser radiation.

REFERENCES

[1] T. Krause, S. Engler, J. Günster, J. G. Heinrich, "Process and a Device for Producing Ceramic Molds." U.S. Pat. No. 6,827,988, B2 (2004).

[2] J, Günster, S. Engler, J. G. Heinrich, "Forming of complex shaped ceramic products via layer-wise slurry deposition (LSD)," Bull. Eur. Ceram. Soc., 1 25-28 (2003).

[3] X. Tian, J. Günster, J. Melcher, D. Li, J. G. Heinrich, "Process parameters analysis of direct laser sintering and post treatment of porcelain components using Taguchi's method," J. Eur. Cerami. Soc., 29 1903-15 (2009).

[4] W. Loschau, R. Lenk, S. Scharek, M. Teichgräber, S. Nowotny, C. Richter, "Prototyping of Complex-Shaped Parts and Tools of Si/SiC Ceramics by Selective Laser Sintering", Ceramics: Getting into the 2000's, 9th Cimtech-World Ceramics Congress, Florence, vol. B, 567-573 (1998).

[5] Q. Lonné, N. Glandut, P. Lefort, "Surface densification of porous ZrB2-39 mol. % SiC ceramic composites by a laser process", J. Eur. Ceram. Soc., 32 955-963 (2012).

[6] Ph. Bertrand, F. Bayle, C Combe, P. Goeuriot, I. Smurov, "Ceramic components manufacturing by selective laser sintering," Appl. Surf. Sci., 254 898-992 (2007).

[7] A. Zocca, P. Colombo, J. Günster, T. Mühler, J. G. Heinrich, "Selective laser densification of lithium aluminosilicate glass ceramic tapes", Appl. Surf. Sci. 265 610-614 (2013).

[8] ASTM F2792-10 Standard Terminology for Additive Manufacturing Technologies, ASTM, USA, (2012).

[9] Jensen, K.: State-of-the Art of Different Available and Coming RP-Systems. Proceedings of "2nd Scandinavian Rapid Prototyping Conference, Exhibition and Course", Aarhus, 1993.

[10] Sheng, X., Tucholke, U.: On Triangulating Surface Models for SLA. Proceedings of the 2nd International Conference on Rapid Prototyping, Dayton, Ohio, Jun. 23-26, 1991.

[11] Lakshminarayan, U., Zong, G., Richards, W., Marcus, H.: Solid Free Form Fabrication of Ceramics. Proceedings of the Symposium on Synthesis and Processing of Ceramics, Fall Meeting of the Material Research Society, Boston, Mass., Dec. 2-6, 1991.

[12] J. C. Nelson, S. Xue, J. W. Barlow, J. J. Beaman, H. L. Marcus, D. L. Bourell, "Model of the selective laser sintering of Bisphenol-A polycarbonate," Ind. Eng. Chem. Res. 32 2305-2317 (1993).

[13] W. Cooke, R. A. Tomlinson, R. Burguete, D. Johns, G. Vanard, "Anisotropy, homogeneity and ageing in an SLS polymer," Rapid Prototyping Journal, 17 269-279 (2011).

[14] Pickering, Simon: Rapid Prototyping turns to PM for new Solutions. Met. Powd. Rep. 50 [3] (1995), 30-33.

[15] Pacheco, J. M.: Rapid Prototyping, MTIAC Report TA-91-01, January 1991. Haase, B.: Stereolithography at Chrysler Motors, Microcad News, [8] 1990.

[16] Machlis, S.: Cubital Claims Advantages Over Stereolithography, Design News, 30 (1990).

[17] F. P. Jacobs, "Rapid prototyping and manufacturing fundamentals of stereolithography," Dearborn, SME (1992).

[18] M. L. Griffith, J. W. Halloran, "Freeform fabrication of ceramics via stereolithography," J. Am. Ceram. Soc. 79, 2601-608 (1996).

[19] M. A. Yardimci, S. Guceri, "Conceptual framework for the thermal process modeling of fused deposition," Rapid Prototyping Journal, 2 26-30 (1996).

[20] Feygin, M., Hsieh, B., Melkanoff, M.: Laminated Object Manufacturing (LOM): A New Tool in the CIM World. Proceedings of PROLAMAT 1992, Tokyo, Japan, June 1992.

[21] Griffin, C., Danfenbach, J. D., McMillin, S.: Desktop Manufacturing: LOM vs Pressing. Am Ceram. Soc. Bull. 73 (1994), 109-113

[22] Reinhold Melcher "Rapid Prototyping von Keramiken durch 3D-Drucken," [Rapid prototyping of ceramics by 3D printing] Dissertation Erlangen 2009.

[23] J. Ebert, E. Ozkol, A. Zeichner, K. Uibel, O. Weiss, U. Koops, R. Telle, H. Fischer "Direct inkjet printing of dental prostheses made of zirconia," J. Dent. Res. 88 [7] 673-676 (2009).

The present invention has been explained with reference to exemplary embodiments. These exemplary embodiments should never be interpreted as restrictive for the present invention. The claims below represent an initial, non-binding attempt to provide a general definition of the invention.

What is claimed is:

1. A process for the additive manufacture of a green ceramic body, the process comprising:
    (a) providing a slip formed with particles of a structure-forming ceramic material suspended in a liquid phase,
    (b) wherein the slip does not comprise any organic or inorganic additives which are gelled or crosslinked by thermal or optical methods;
    (c) producing a slip layer;
    (d) directing radiation from a laser light source onto a section of the slip layer, thereby selectively sectionally exposing the slip-layer section to the laser radiation,
    (e) wherein said laser radiation vaporizes liquid phase from the slip-layer section onto which the laser radiation from the laser light source is or has been oriented,
    (f) wherein the vaporization causes an attractive interaction between particles of the structure-forming ceramic material in the slip-layer section to form agglomerations and the agglomerated particles are not resuspended in the liquid phase in the slip-layer section; and (g) wherein said laser radiation further results in a sinter-free formation of a section of the green ceramic body in the slip layer;
(h) optionally repeating the steps of producing, directing, vaporizing, and sinter-free formation until the green ceramic body is obtained; and
(i) subsequently separating the non-sintered green ceramic body from the slip.

2. The process according to claim 1, further comprising drying the non-sintered green ceramic body after the non-sintered green ceramic body has been separated from the slip.

3. The process according to claim 1, wherein a proportion of the structure-forming ceramic material in the slip is at least 60% by volume.

4. The process according to claim 1, wherein a proportion of organic and/or inorganic auxiliaries in the slip does not exceed 5% by volume.

5. The process according to claim 1, wherein a proportion of organic auxiliaries in the slip does not exceed 3% by volume; and/or
the slip is an aqueous slip and is substantially free from organic solvents; or
the liquid phase of the slip comprises an organic solvent that can be vaporized to leave no residue.

6. The process according to claim 1, wherein the resultant slip layer has a thickness in a range from 25 µm to 2 mm.

7. The process according to claim 1, which comprises causing the laser light source to emit radiation in a wavelength range from 520 nm to 10 µm.

8. The process according to claim 7, which comprises causing the laser light source to emit radiation at least of a wavelength in a wavelength range from 600 nm to 3 µm and/or providing a configuration in which the laser light source inputs a proportion of at least 1% of the laser power incident on the slip layer directly into the liquid phase.

9. The process according to claim 8, which comprises providing a laser light source emitting radiation at least of a wavelength in a wavelength range of 1970 nm±100 nm.

10. The process according to claim 1, which comprises providing a laser light source selected from the group consisting of an NdYAG laser, a Thulium fiber laser, and a laser diode.

11. The process according to claim 1, wherein the step of directing radiation comprises focusing laser radiation onto or into the slip layer and/or guiding a directed and/or focused laser beam along an exposure trace that proceeds on or in the slip layer.

12. The process according to claim 11, wherein the exposure trace is represented, at least in sections, by a continuous and/or interrupted line.

13. The process according to claim 11, wherein the exposure trace is represented, at least in sections, as a shape selected from the group consisting of a lattice, a grid, a spiral, an ellipse, a circle, a group of lines and a pattern.

14. The process according to claim 1, where a dimension of oriented and/or focused laser radiation on a surface of the slip layer at least in one direction lies in a range from 25 µm to 25 mm.

15. The process according to claim 14, which comprises moving the directed and/or focused laser radiation on or in the slip layer with a velocity in a range from 1 mm/s to 20 m/s.

16. The process according to claim 1, wherein the vaporization step is effected to bring about sinter-free formation of the green-body section in the slip layer, where the liquid phase cannot achieve resuspension of the particles forming the green-body section.

17. The process according to claim 16, wherein a vaporization is followed by capillary-force-driven flow of the liquid phase into the particle aggregate and/or into the slip-layer section onto which the radiation from the laser light source is or has been directed.

18. The process according to claim 11, where the exposure trace is derived from data from a virtual slice method.

19. The process according to claim 1, where the slip layer includes at least an area of 100 mm².

20. The process according to claim 1, wherein a projection area of an exposure trace followed by the laser radiation for the sinter-free formation of a green-body section in the slip layer on the slip layer or in a plane of the slip layer is at most half as large as the area of the cross section of the resultant green-body section on the slip layer or in the plane of the slip layer.

* * * * *